United States Patent
Levi

[15] 3,670,665
[45] June 20, 1972

[54] LAYERING DEVICE FOR CAKE
[72] Inventor: George A. Levi, Saginaw, Mich.
[73] Assignee: Baker Perkins, Inc., Saginaw, Mich.
[22] Filed: Jan. 18, 1971
[21] Appl. No.: 107,139

[52] U.S. Cl. ............................................99/92, 99/443, 57/1 J, 198/35
[51] Int. Cl. ..............................................A23g 3/00
[58] Field of Search ...................107/57 R, 57 A, 57 D, 57 C; 99/443, 92; 57/55 R, 56, 54 R, 54 B, 1 J, 1 G; 198/35, 75, 78, 79, 80

[56] References Cited

UNITED STATES PATENTS

| | | | |
|---|---|---|---|
| 2,264,115 | 11/1941 | Grainger et al. | 107/54 B |
| 3,104,790 | 9/1963 | De Haven | 198/75 X |
| 3,150,614 | 9/1964 | Scarpa | 107/1 F |
| 3,277,846 | 10/1966 | Kesselman | 107/1 J |
| 3,605,640 | 9/1971 | Lunin | 107/1 J |

FOREIGN PATENTS OR APPLICATIONS

| | | | |
|---|---|---|---|
| 483,448 | 10/1929 | Germany | 198/75 |

*Primary Examiner*—James R. Boler
*Attorney*—Learman & McCulloch

[57] ABSTRACT

An apparatus and a method of making products such as layered cake comprising an oven for receiving and baking food product passed therethrough, a band conveyor for conveying a plurality of continuous strips of food product, such as cake, through said oven in side-by-side relation, and a plurality of conveyors for receiving the baked strips of food product from the band conveyor and transposing the strips into vertically superposed, stacked relation.

15 Claims, 6 Drawing Figures

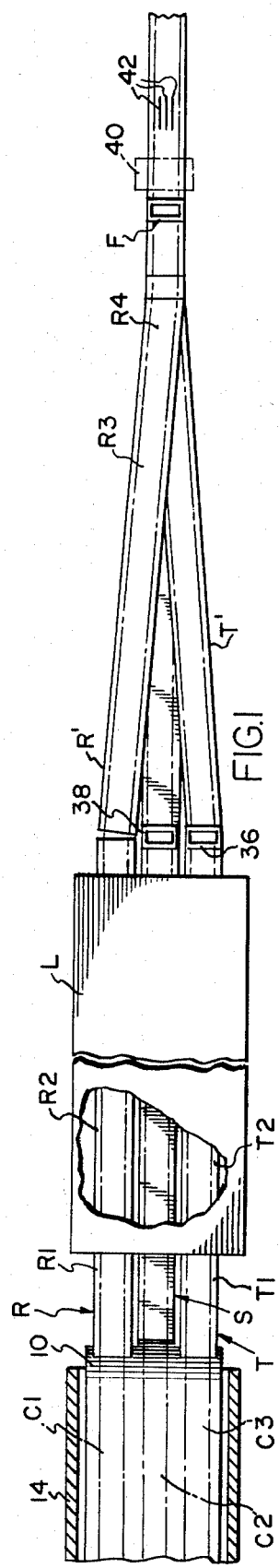
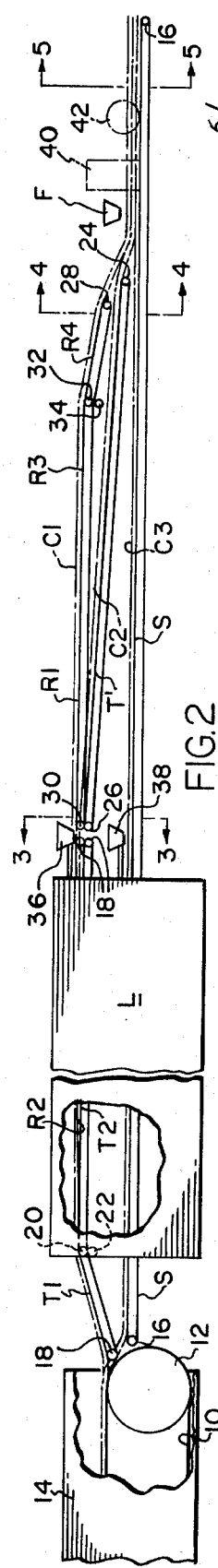
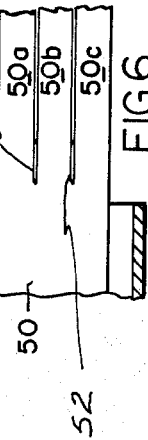
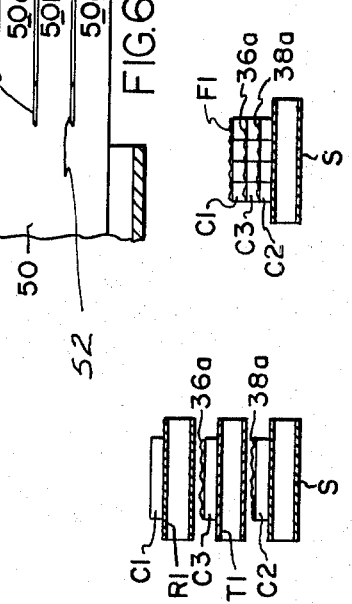
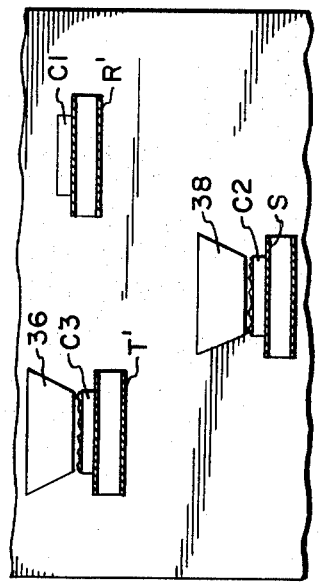
INVENTOR
GEORGE A. LEVI
BY *Learman & McCulloch*
ATTORNEYS 3,670,665

LAYERING DEVICE FOR CAKE

FIELD OF THE INVENTION

This invention relates to food handling methods and apparatus and more particularly to methods and apparatus for forming a sandwich type food product with a plurality of continuous food strips.

BACKGROUND OF THE INVENTION

Layered cakes in conventional bakeries are placed in baking pans so that they can be moved through an oven and cooler on pan conveyors. Such processing additionally requires depanning equipment and is unnecessarily expensive. Accordingly, it is an object of the present invention to minimize the cost of making a layered good product, such as cake.

Another object of the present invention is to provide apparatus for making a layered cake with a plurality of side-by-side food product strips which are moved into juxtaposition.

Still another object of the present invention is to provide food product layering apparatus which is used with a tunnel oven having a band conveyor.

A further object of the present invention is to provide food product layering apparatus which provides for the application of filling or icing to the various layers.

A still further object of the present invention is to provide food product layering apparatus which facilitates the cutting and slicing of the layered product into individual cake products.

Other objects and advantages of the present invention will become apparent to those of ordinary skill in the art as the description thereof proceeds.

SUMMARY

An Apparatus and a method for making a layered food product comprising an oven for receiving and baking food product as it is passed therethrough, means for longitudinally conveying a plurality of continuous strips of food product, such as cake, in side-by-side relation through said oven, and means for receiving the plurality of strips and transposing them into vertically superposed, stacked relation.

The present invention may more readily be described by reference to the accompanying drawings, in which:

FIG. 1 is a top plan, partly sectional view of apparatus constructed according to the present invention, parts being broken away to more clearly illustrate the disposition of the conveyors within a cooling unit;

FIG. 2 is a side elevational view of the apparatus illustrated in FIG. 1, parts being broken away to more clearly illustrate certain portions thereof;

FIG. 3 is an enlarged, sectional end view taken along the line 3—3 of FIG. 2;

FIG. 4 is an enlarged, sectional end view taken along the line 4—4 of FIG. 2;

FIG. 5 is an enlarged, sectional end view taken along the line 5—5 of FIG. 2; and FIG. 6 is a fragmentary, sectional, top plan view illustrating an alternate embodiment of the invention.

Apparatus constructed according to the present invention is adapted for use with a steel band conveyor 10 trained around a pair of rotatable drums, one of which is shown at 12, connected to the output shaft of a suitable source of power, such as an electric motor (not shown). The steel band conveyor 10 is mounted within a tunnel oven 14 of the type disclosed in U.S. Pat. No. 3,173,384 granted Mar. 16, 1965 to J. A. Dersch et al., and which is incorporated herein by reference, which bakes three continuous side-by-side strips of cake C1, C2 and C3 as they are passed therethrough on the band conveyor 10.

Three continuously driven, side-by-side, endless conveyors R, S, and T are provided for receiving the products C1, C2 and C3 as they emerge from the oven 14. The middle conveyor S extends generally horizontally and is trained around suitable rotatable end members. The upper surface of the upper run of conveyor S is disposed slightly below the upper surface of the upper run of the band conveyor 10.

The conveyors R and T include generally parallel, upwardly inclined portions R1 and T1 and generally parallel, horizontally extending portions R2 and T2 respectively. The conveyors R and T are trained around pairs of rotatable members 18 at opposite ends thereof, and run-supporting idlers 20 and 22 may be disposed below the upper and lower runs of the conveyors R and T at the junctions of the inclined and horizontal portions thereof. The conveyors R, S and T all pass through a cooling tunnel or enclosure L, which cools the strips of cake C1, C2 and C3 in the conventional manner by conditioning the cooler atmosphere.

A pair of converging conveyors R' and T' are provided for receiving the products C1 and C3 as they emerge from the cooling tunnel L and are discharged by the conveyors R and T. The conveyor T' is trained around forward and rear rotatable members 24 and 26 respectively. The forward rotatable member 24 is disposed above the upper run of the conveyor S so that the strip C3 is discharged from the conveyor T' onto the cake C2 disposed therebelow on the conveyor S. The conveyor R' is trained around forward and rear rotatable members 28 and 30 respectively, and includes a generally horizontally extending portion R3 and a downwardly inclined portion R4. Rotatable members 32 and 34 may be disposed below the upper and lower runs of the conveyor R' at the junction of the portions R3 and R4.

As the products are discharged from the cooling tunnel L, cream or filling depositors 36 and 38 are disposed above the conveyors R' and S, for dressing the upper surfaces of the strips of cake C2 and C3, respectively with a food filling or preparation 36a and 38a respectively. The rotatable member 28 is disposed slightly above the upper run of the conveyor T' and the strip C3, and is positioned slightly rearwardly of the rotatable member 24 so that the cake strip C1 is discharged from the conveyor R' onto the layer 36a already positioned atop the cake strip C3 (FIG. 4).

A frosting depositor F may be provided above the stacked strip of cake, downstream of the point of confluence of the three strips, for depositing a layer of frosting F1 (FIG. 5) on the upper surface of the uppermost strip C1. Transverse and longitudinal cutting members 40 and 42 are provided downstream of the point of confluence of the strips C1, C2 and C3 for cutting the strips C1, C2 and C3 into proper widths and lengths for packaging. The cakes may then be passed to wrapping machinery downstream of the cutters for suitable wrapping. It should be understood that at least one of the rotatable members of each of the conveyors above mentioned, is connected with a suitable drive member (not shown).

THE OPERATION

The continuous strips of cake C1, C2 and C3 are baked in the oven 14 and are passed onto the conveyors R, S and T. The conveyors R and T initially move the strips C1 and C3 upwardly relative to the strip C2 so that the strips C1 and C3 are vertically spaced from the strip C2 as the cake strips C1, C2 and C3 pass through the cooling unit L. After the cake strips emerge from the cooling tunnel L, the depositors 36 and 38 dress the strips C3 and C2 with filling layers 36a and 38a respectively. The strips C1, C2 and C3 are then brought into superposed relation by the laterally converging conveyors R' and T' which vertically align with the conveyor S at their discharge ends. The icing F1 is applied by the frosting depositor F and the cutter members 40 and 42 cut the superposed composite strip into proper lengths and widths. From there, the cakes proceed to wrapping machines.

In another embodiment of the invention illustrated in FIG. 6, the cake is baked in the oven as a single strip 50 and vertical knives 51 and 52 are provided at the outlet end of the oven 14' for cutting the single strip 50 longitudinally into a plurality of strips 50a, 50b and 50c, as the strip 50 emerges from the oven. Thereafter, the process proceeds as previously described.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. Apparatus for making a layered food product comprising:
   a tunnel oven for receiving and baking food product as it is passed therethrough;
   a conveyor passing through said tunnel oven for conveying strips of food product through said oven in side-by-side relation;
   cooler means for receiving and cooling the baked strips of food product; and
   conveying means for receiving the products from said conveyor and for conveying the strips of food product through said cooler means, said conveying means including means for transposing said strips of food into vertically superposed, stacked relation.

2. Apparatus as set forth in claim 1 wherein said conveying means includes means for conveying at least one of said strips vertically to vertically space said strips; and means for relatively conveying the vertically spaced strips laterally into vertically superposed relation and disposing said strips one atop the other in stacked relation.

3. The apparatus as set forth in claim 1 wherein said conveying means includes first, second and third conveying means; said first conveying means being generally horizontally disposed, and said second and third conveying means including upwardly extending portions and angled portions which converge laterally so that the discharge end portion thereof is in superposed relation with said first conveying means to discharge the strip thereon onto the strip disposed immediately therebelow.

4. The apparatus as set forth in claim 1 including means for dressing at least one of said strips with a food filling prior to transposing the strips in stacked relation.

5. The apparatus as set forth in claim 4 including means for topping the uppermost layer of said stacked strips with a food preparation.

6. The apparatus as set forth in claim 4 including means for cutting the stacked strips into a plurality of individual food segments.

7. A method of making a layered food product comprising the steps of:
   longitudinally conveying a plurality of continuous strips of food product, such as cake, in side-by-side relation;
   baking said strips; and
   transposing the baked strips into vertically superposed stacked relation.

8. The method of claim 7 including the step of dressing at least one of said strips with a food preparation prior to transposing the strips into stacked relation.

9. The method as set forth in claim 8 including the step of topping the stacked strips with a food preparation.

10. The method as set forth in claim 7 including the step of cutting the stacked strips into individual food segments.

11. The method as set forth in claim 7 wherein the step of transposing is accomplished by vertically spacing the strips and converging said strips into superposed relation.

12. The method as set forth in claim 11 including the step of cooling the strips prior to stacking them.

13. Apparatus for making a layered food product comprising:
    a bakery processing unit for treating food product;
    means for longitudinally conveying a plurality of continuous strips of food product, such as cake, in side-by-side relation through said bakery processing unit; and
    means for receiving the plurality of strips from the conveying means as the strips emerge from the bakery processing unit and transposing them into vertically superposed, stacked relation.

14. Apparatus for making a layered food product comprising:
    an oven for receiving and baking food product as it is passed therethrough;
    a conveyor passing through said oven for longitudinally conveying longitudinally continuous food product through said oven along a horizontal plane; and
    means for receiving the product from said conveyor and for relatively vertically moving longitudinally continuous portions of said food products relative to other longitudinally continuous portions of said food product, and for forwardly converging the longitudinally continuous portions into vertically superposed, stacked relation while moving the products forwardly.

15. The apparatus set forth in claim 14 including cutter means for severing the baked food product into individual, continuous longitudinal strips comprising said longitudinally continuous portions.

* * * * *